2,903,356

ANIMAL GROWTH STIMULATION COMPOSITIONS

J. Oliver Lampen and Asger F. Langlykke, Highland Park, and Harold Yacowitz, Bound Brook, N.J., assignors to Olin Mathieson Chemical Corporation, New York, N.Y., a corporation of Virginia No Drawing. Application July 22, 1957
Serial No. 673,116

5 Claims. (Cl. 99—2)

This invention is concerned generally with improved animal feeds containing a novel growth-promoting supplement. More particularly, it relates to animal feeds supplemented by a combination of an anti-bacterial antibiotic with a member of the class consisting of nystatin and amphotericin, for growth promotion, and with the method of accelerating the growth of animals by the administration of feedstuffs containing this novel growth-promoting supplement.

It is known that, in addition to the usual nutrients and vitamins required in the diet of animals, it is necessary to include a sufficient quantity of a factor identified as the "animal protein factor" in order to promote maximum growth. This has given rise to the use of various complex substances such as meat scraps, fish metal and fish solubles containing this factor in varying amounts to supplement the animal diet. It was previously thought that, when animals were fed a diet complete with respect to the usual nutrients and vitamins, and also containing an adequate amount of the "animal protein factor," the growth of said animals was the maximum obtainable with the species of animals under the conditions employed.

It was subsequently determined that it is possible to achieve an acceleration in the growth rate of animals superior to that obtainable with the complete diet hereinbefore described by supplementing said diet with small quantities of anti-bacterial antibiotics.

It has not been found that the combining of a member of the class consisting of nystatin and amphotericin with the antibacterial antibiotics results in an unexpected acceleration in the growth rate beyond that obtained by the use of the anti-bacterial antibiotics and, of course, far superior to the growth rate obtained by the use of the diet containing only the usual nutrients, vitamins and adequate amounts of the "animal protein factor."

It, therefore, is an object of this invention to provide an animal feed supplement which essentially comprises one or more of the anti-bacterial antibiotics (e.g. penicillin, streptomycin, neomycin, bacitracin, gramicidin, tetracycline, oxytetracycline and chlortetracycline) and one or more members of the class consisting of nystatin and amphotericin.

It is a further object of this invention to provide a method of accelerating the growth of animals by the administration of one or more of the anti-bacterial antibiotics and one or more members of the class consisting of nystatin and amphotericin.

The preparation and properties of the anti-bacterial antibiotics have been reported in the literature, and nystatin and amphotericin preparations have also been amply described. For example, nystatin is the subject of an article by Dutcher et al., entitled "The Preparation and Properties of Crystalline Fungicin (Nystatin)," in Antibiotics Annual, 1953–1954, Medical Encyclopedia, Inc., New York, 1953, page 191; and, amphotericin is described in an article by Gold et al., entitled "Amphotericins A and B, Anti-Fungal Antibiotics Produced by a Streptomycete," in Antibiotics Annual, 1955–1956, Medical Encyclopedia, Inc., New York, 1956, page 579.

It is noted that combinations of a member of the group consisting of nystatin and amphotericin with an anti-bacterial antibiotic have been utilized quite effectively in human therapy. These combinations have been administered in a variety of dosage forms (e.g. tablets and capsules), the nystatin being present in a concentration of the order of 250,000 units per dosage unit.

When applicants' feed supplement is added to an otherwise nutritionally adequate diet, it has been found that the animals gain weight more rapidly than animals fed the same diet without the added supplement; furthermore, the animals fed the feed supplement of applicants' invention gain weight more rapidly than animals fed a nutritionally-adequate diet plus the anti-bacterial antibiotics (without including an antibiotic of the class consisting of nystatin and amphotericin). Moreover, this growth-promoting effect, resulting from the incorporation of applicants' feed supplement in the animal diet, is obtained whether the supplement is added to a nutritionally-adequate feedstuff (as, for example, an animal feed containing all known nutrients and a source of animal protein factor) or whether the supplement is added to a nutritionally-deficient feedstuff.

Although the antibiotics can be administered to the animal in a number of ways, it is presently preferred to prepare a supplementary feed for administration to the animal either separately or in combination with a feedstuff containing the usual nutrients and vitamins. The antibiotics can be added to the supplementary feed in any one of a number of forms, for example, in the form of their salts, or in the form of a concentrate or adsorbate prepared from the fermentation broths. When it is desired to administer the feed supplement in combination with the feedstuff containing the usual nutrients and vitamins, any suitable method for dispersing the supplement uniformly throughout the feedstuff can be used.

The amount of antibiotics added to the animal diet may be varied while still achieving the beneficial results of this invention. In general, concentrations of nystatin or amphotericin of the order of 1 to 200 grams (3,000,000–600,000,000 units) per pound of feed supplement in combination with the anti-bacterial antibiotics at levels of the order of 4 to 40 grams per pound of feed supplement (depending on the potency of the antibiotic being used) promote the maximum growth of animals fed the antibiotic supplemented diet continuously. If the diet is fed intermittently, concentrations of nystatin or amphotericin of the order of 25 to 200 grams (75,000,000–600,000,000 units) per pound of feed supplement are indicated. While an acceleration of the growth rate is obtained with these various concentrations of nystatin, it is preferred to utilize of the order of 10 grams (30,000,000 units) of nystatin or amphotericin per pound of feed supplement.

In addition to including the anti-bacterial antibiotics and the antibiotic selected from the class consisting of nystatin and amphotericin in the feed supplement, certain other ingredients may be added which impart nutritional properties, serve as anti-caking agents or merely serve as "fillers" to facilitate the administration of the feed supplement to the animals or the mixing of the feed supplement with the normal diet. A soybean meal by-product vegetable protein supplement marketed as Glidden SO–40 by the Glidden Co. of Chicago, Illinois, may be used for its nutritional value and as a carrier. Anti-caking agents which may be utilized include synthetic calcium silicate or calcium stearate compounds. Oyster shell or limestone may be used as a "filler" or "carrier" in addition to serving as a calcium supplement in the various feed supplements.

As previously stated, the feed supplement may be fed directly to the animals or, it may be administered in combination with the feedstuff containing the usual nutrients and vitamins. When administering the supplement in combination with the feedstuff, 1 to 10 pounds of the feed supplement can be added per ton of the feedstuff, depending upon the animal species being fed.

The term "broad spectrum antibacterial antibiotic," as herein employed, includes a combination of two or more limited-spectrum antibiotics which together have the desired broad spectrum.

The following examples illustrate the compositions of the present invention, it being understood that these examples are given for purposes of illustration and not of limitation:

EXAMPLE I

| | Gm. |
|---|---|
| Streptomycin whole dried broth equivalent to 18 gm. streptomycin sulfate | 226.8 |
| Procaine penicillin (907 units/mg.) | 22.6 |
| Nystatin (3,340 units/mg.) | 9.072 |
| Soybean meal by-product vegetable protein supplement (Glidden SO–40) (1 pound) | 195.04 |
| | 453.512 |

EXAMPLE II

| | |
|---|---|
| Streptomycin whole broth equivalent to 14.9 gm. streptomycin sulfate | 188.69 |
| Procaine penicillin (907 units/mg.) | 4.98 |
| Nystatin (3,340 units/mg.) | 1.99 |
| Soybean meal by-product vegetable protein supplement (Glidden SO–40) (1 pound) | 257.91 |
| | 453.57 |

EXAMPLE III

Replace the soybean meal by-product vegetable protein supplement of Example II with 235.23 gm. of this supplement plus 22.68 gm. calcium stearate.

EXAMPLE IV

Replace the soybean meal by-product vegetable protein supplement of Example II with 257.91 gm. oyster shell.

EXAMPLE V

Replace the soybean meal by-product vegetable protein supplement of Example II with 235.23 gm. oyster shell plus 22.68 gm. calcium silicate (Micro-Cel, Johns-Manville Co., New York).

Feedstuffs supplemented with the antibiotic combinations of this invention are particularly suitable for the commercial raising of poultry. This is of economic importance to the poultry raiser, since it enables him to increase the capacity of his equipment. The use of such supplemented diets accelerate the rate at which poultry, such as chickens, turkeys and ducks are brought to marketable weight, as indicated by the following experiment.

Eighty-five one day old White Plymouth Rock chicks were wing-banded, put into a thermostatically-heated chick battery brooder and fed a basal ration for two weeks. At the end of the two week period, the chicks were weighed and distributed into eight uniform groups each containing an equal number of males and females. The chicks were then given the diets (and supplemented diets) shown in Table I. Feed and water were supplied ad libitum during the entire experiment. After three weeks on the test rations, the chicks showed the weight gains indicated in Table I.

Table I

| Diets* | No. of Chicks | Initial Weight (gm.) (2 weeks of age) | 3 week gain (gm.) (5 weeks of age) |
|---|---|---|---|
| 1 | 12 | 153 | 420 |
| 2 | 11 | 143 | 422 |
| 3 | 9 | 158 | 426 |
| 4 | 9 | 155 | 477 |

*The diets were:
1. Basal Ration—

| | Percent |
|---|---|
| Dextrose [1] | 60.85 |
| Purified soy protein [2] | 26.00 |
| Cellulose [3] | 3.00 |
| Salts IS [4] | 5.00 |
| Hydrogenated vegetable oil [5] | 3.00 |
| Vitamin mix (in sucrose) [6] | 1.00 |
| dl methionine | 0.70 |
| Glycine | 0.30 |
| Choline chloride | 0.30 | to which is added 50 mg. alpha-tocopherol/kg. and 15 mcg. vitamin B-12/kg. of diet.

[1] Cerelose, No. 2001, Corn Products Refining Co., New York, New York.
[2] Drackett C-1, Drackett Products Co., Cincinnati, Ohio.
[3] Cellufour, Chicago Dietetic Supply House, Chicago, Illinois.

[4]
| | Gm./kg. of diet |
|---|---|
| $Ca_3(PO_4)_2$ | 20.70 |
| $K_2HPO_4$ | 10.30 |
| $CaCO_3$ | 6.50 |
| $MgCO_3$ | 2.00 |
| NaCl | 5.00 |
| Fer citrate | 1.30 |
| $MnSO_4.H_2O$ | 3.57 |
| $ZnCO_3$ | 0.10 |
| $CuSO_4.5H_2O$ | 0.05 |
| KI | 0.05 |
| $CoCl_2.6H_2O$ | 0.02 |

[5] Primex, Procter & Gamble, Cincinnati, Ohio.

[6]
| | Mg./kg. of diet |
|---|---|
| Biotin | 0.15 |
| Menadione (K) | 0.40 |
| Folic Acid | 0.80 |
| Pyridoxine Hydrochloride | 4.50 |
| Riboflavin | 10.00 |
| Thiamine nitrate | 20.00 |
| Calcium Pantothenate | 20.00 |
| Niacinamide | 30.00 |
| Inositol | 250.00 |
| Vitamin A | USP units 5,000 |
| Vatimin D₂ | do 800 |

2. Basal Ration plus 100 grams nystatin (3,550 units/mg.) per ton of diet.
3. Basal Ration plus neomycin sulfate technical (427 micrograms/mg.) equivalent in activity to 85 gm. of the free base per ton of diet, tetracycline hydrochloride (925 mcg./mg.) equivalent in activity to 195 gm. of the free base per ton of diet, bacitracin methylene disalicylate (160 gm. bacitracin per pound) equivalent in activity to 70 gm. of bacitracin per ton of diet.
4. Treatment 3 plus 100 grams nystatin (3,550 units/mg.) per ton of diet.

The feed supplements of this invention when added to pig feeds resulted in an increase in the daily weight gain of the animals as indicated hereinafter.

| Treatment (per pound of feed) | Dirt Lot Period, Daily gain, lb. |
|---|---|
| 1. Control (no antibiotics) | .99 |
| 2. 5.4 mg. chlortetracycline | 1.25 |
| 3. No. 2 plus 2.7 mg. nystatin | 1.35 |
| 4. 2.7 mg. nystatin | 1.25 |

The pigs were weaned at approximately 10 pounds in weight and were immediately placed on test. The pigs were confined to concrete dry lots until 50 pounds in weight and then were transferred to old dirty dry lots. A mash feed was used and a total of 48 pigs were tested (2 replicates, 4 treatments, 6 pigs per treatment) during a period of 50 days.

Further testing with swine (growing hogs) involving the comparison of results obtained with and without the addition of nystatin to feeds containing broad spectrum antibiotics gave the following results:

THE ADDITION OF NYSTATIN TO RATION OF HOGS FED IN DIRT DRY LOTS

| | | | | | |
|---|---|---|---|---|---|
| Number of days on experiment | 0 | 14 | 29 | 55 | 62 |
| Number of Days in Period | 0 | 14 (0–14th day) | 15 (14–29th day) | 26 (29–55th day) | 7 (55–62d day) |
| Control (37.5 mg. chlortetracycline, 12.5 mg. penicillin per pound of feed): | | | | | |
| Average weight per pig | 88.68 | 101.95 | 125.20 | 179.00 | 194.47 |
| Daily gain per period | | .95 | 1.55 | 2.07 | 2.21 |
| Cumulative daily gain | | | 1.26 | 1.64 | 1.71 |
| Cumulative feed conversion [1] | | | 351 | 353 | 359 |
| Nystatin (3 mg. plus 37.5 mg. chlortetracycline and 12.5 mg. penicillin per pound of feed) | | | | | |
| Average weight per pig | 88.78 | 105.24 | 133.15 | 188.88 | 205.87 |
| Daily gain per period | | 1.18 | 1.86 | 2.14 | 2.43 |
| Cumulative daily gain | | | 1.53 | 1.82 | 1.89 |
| Cumulative feed conversion [1] | | | 319 | 344 | 347 |

[1] Feed conversion=lbs. of feed per 100 lb. of gain.

The feed supplements of this invention not only provide an acceleration in the growth rate of the animals fed this supplement but, are efficacious in preventing or checking diseases in poultry, swine and other animals.

The invention may be variously otherwise embodied within the scope of the appended claims.

What is claimed is:

1. An animal feedstuff for accelerating the growth of animals, comprising essentially a solid feedstuff, nutritionally adequate per se, having incorporated therein a broad-spectrum antibacterial antibiotic, and a member of the class consisting of nystatin and amphotericin, the former being present in an amount between about 4 and 400 grams per ton of said feedstuff and the latter being present in an amount between about 3 and 6000 million units per ton of said feedstuff.

2. An animal feedstuff for accelerating the growth of animals, comprising essentially a solid feedstuff, nutritionally adequate per se, having dispersed therein a broad-spectrum antibacterial antibiotic, and a member of the class consisting of nystatin and amphotericin, the former being present in an amount between about 4 and 400 grams per ton of said feedstuff and the latter being present in an amount between about 3 and 6000 million units per ton of said feedstuff.

3. An animal feedstuff for accelerating the growth of animals, comprising essentially a solid feedstuff, nutritionally adequate per se, having dispersed therein a broad-spectrum antibacterial antibiotic and nystatin, the former being present in an amount between about 4 and 400 grams per ton of said feedstuff and the latter being present in an amount of the order of 30 million units per ton of said feedstuff.

4. An animal feedstuff for accelerating the growth of animals, comprising essentially a solid feedstuff, nutritionally adequate per se, having dispersed therein chlortetracycline and nystatin, the chlortetracycline being present in an amount between about 4 and 400 grams per ton of said feedstuff and the nystatin being present in an amount between about 3 and 6000 million units per ton of said feedstuff.

5. The feedstuff of claim 4 wherein the nystatin is present in an amount of the order of 30 million units per ton of said feedstuff.

References Cited in the file of this patent

Antibiotics Annual, 1953–54, pp. 199–209, Medical Encyclopedia, Inc.

Cunha: Use of Antibiotics in Agr., pp. 9–17, National Aca. of Sc., Washington, D.C., 1956.

UNITED STATES PATENT OFFICE
CERTIFICATE OF CORRECTION

September 8, 1959

Patent No. 2,903,356

J. Oliver Lampen et al.

It is hereby certified that error appears in the printed specification of the above numbered patent requiring correction and that the said Letters Patent should read as corrected below.

Column 1, line 29, for "metal" read -- meal --; line 42, for "not" read -- now --; column 3, line 39, Example I, strike out "(1 pound)" and insert the same before "453.512" in line 41; line 49, Example II, strike out "(1 pound)" and insert the same before "453.57" in line 51, same column.

Signed and sealed this 1st day of March 1960.

(SEAL)
Attest:

KARL H. AXLINE

Attesting Officer

ROBERT C. WATSON
Commissioner of Patents